United States Patent
Suzuki

(10) Patent No.: US 11,852,241 B2
(45) Date of Patent: Dec. 26, 2023

(54) SLIDING COMPONENT

(71) Applicant: Eagle Industry Co., Ltd., Tokyo (JP)

(72) Inventor: Hiroshi Suzuki, Tokyo (JP)

(73) Assignee: EAGLE INDUSTRY CO., LTD.

( * ) Notice: Subject to any disclaimer, the term of this patent is extended or adjusted under 35 U.S.C. 154(b) by 134 days.

(21) Appl. No.: 17/425,281

(22) PCT Filed: Jan. 31, 2020

(86) PCT No.: PCT/JP2020/003648
§ 371 (c)(1),
(2) Date: Jul. 22, 2021

(87) PCT Pub. No.: WO2020/162352
PCT Pub. Date: Aug. 13, 2020

(65) Prior Publication Data
US 2022/0128088 A1      Apr. 28, 2022

(30) Foreign Application Priority Data

Feb. 4, 2019   (JP) .................................. 2019-017876

(51) Int. Cl.
*F16J 15/32*      (2016.01)
*F16J 15/3256*   (2016.01)

(52) U.S. Cl.
CPC ................. *F16J 15/3256* (2013.01)

(58) Field of Classification Search
CPC ................................................. F16J 15/3256
See application file for complete search history.

(56) References Cited

U.S. PATENT DOCUMENTS

| 3,383,116 A | 5/1968 | Carter .............................. 277/96 |
| 3,527,465 A | 9/1970 | Guinard |
| 3,675,935 A | 7/1972 | Ludwig ................... F16J 15/342 |

(Continued)

FOREIGN PATENT DOCUMENTS

| CN | 1245552 | 2/2000 | ............... F16J 15/34 |
| CN | 2460801 | 11/2001 | ............... F16J 15/40 |

(Continued)

OTHER PUBLICATIONS

U.S. Appl. No. 16/959,105, filed Jun. 29, 2020, Imura.
(Continued)

*Primary Examiner* — Vishal A Patel
(74) *Attorney, Agent, or Firm* — HAYES SOLOWAY P.C.

(57) ABSTRACT

There is provided a sliding component that supplies a sealed fluid to a leakage side in a gap between sliding surfaces to exhibit high lubricity and has a small leakage of the sealed fluid. A sliding component has an annular shape and is disposed in a place where relative rotation is performed in a rotary machine. The sliding component includes a plurality of dynamic pressure generating mechanisms provided in a sliding surface of the sliding component. Each of the dynamic pressure generating mechanisms includes a deep groove portion that communicates with a leakage side, and a shallow groove portion that communicates with the deep groove portion and extends from the deep groove portion in a circumferential direction. An end portion in an extending direction of the shallow groove portion is formed into a tapered shape in a plan view.

12 Claims, 9 Drawing Sheets

(56) References Cited

U.S. PATENT DOCUMENTS

| | | | | |
|---|---|---|---|---|
| 3,704,019 | A | 11/1972 | McHugh | 277/400 |
| 3,782,737 | A | 1/1974 | Ludwig et al. | 277/27 |
| 4,056,478 | A | 11/1977 | Capelli | C01M 5/00 |
| 4,071,253 | A | 1/1978 | Heinen et al. | 277/3 |
| 4,523,764 | A | 6/1985 | Albers et al. | 277/3 |
| 4,889,348 | A | 12/1989 | Amundson | 277/306 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,222,743 | A * | 6/1993 | Goldswain | F16J 15/3412 277/400 |
| 5,224,714 | A | 7/1993 | Kimura | 277/400 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 8,757,632 | B2 | 6/2014 | Dobosz | F16J 15/3412 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,353,867 | B2 | 5/2016 | Itadani et al. | F16J 15/3448 |
| 9,494,239 | B2 | 11/2016 | Hosoe | F16J 15/3412 |
| 9,512,923 | B2 | 12/2016 | Inoue et al. | F16J 15/34 |
| 9,574,667 | B2 | 2/2017 | Takahashi et al. | F16J 15/342 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,823,162 | B2 | 11/2020 | Kume | F04B 27/1804 |
| 10,865,883 | B2 | 12/2020 | Seki et al. | F16J 15/3404 |
| 11,248,706 | B2 | 2/2022 | Imura | F16C 33/74 |
| 11,320,052 | B2 | 5/2022 | Imura et al. | F16J 15/34 |
| 2002/0014743 | A1 | 2/2002 | Zheng | 277/358 |
| 2002/0093141 | A1 | 7/2002 | Wang | F16J 15/34 |
| 2002/0158416 | A1 | 10/2002 | Hosanna | F16J 15/3404 |
| 2004/0080112 | A1 | 4/2004 | Tejima | F16J 15/3436 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0100001 | A1 | 5/2008 | Flaherty | |
| 2009/0200749 | A1 | 8/2009 | Teshima | F16J 15/3484 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1* | 1/2012 | Watanabe | F16J 15/441 277/387 |
| 2012/0217705 | A1 | 8/2012 | Hosoe | 277/400 |
| 2013/0168928 | A1 | 7/2013 | Schrufer | C10M 103/02 |
| 2013/0209011 | A1 | 8/2013 | Tokunaga | |
| 2014/0159314 | A1 | 6/2014 | Hosoe | F16J 15/34 |
| 2014/0197600 | A1 | 7/2014 | Hosoe | F16J 15/342 |
| 2014/0203517 | A1 | 7/2014 | Ferris | F16J 15/3412 |
| 2014/0217676 | A1 | 8/2014 | Hosoe et al. | 277/350 |
| 2014/0319776 | A1 | 10/2014 | Theike et al. | |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0175726 | A1 | 6/2017 | Kume | F04B 27/1804 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0364034 | A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 106029294 | 10/2016 | B23K 26/364 |
| CN | 205877184 | 1/2017 | F16J 15/16 |
| CN | 205877198 | 1/2017 | F16J 15/34 |
| CN | 106439023 | 2/2017 | F16J 15/16 |
| CN | 106763778 | 5/2017 | F16J 15/16 |
| CN | 107489770 | 12/2017 | F16J 15/34 |
| CN | 107906206 A * | 4/2018 | F16J 15/34 |
| CN | 109237042 | 1/2019 | F16J 15/34 |
| CN | 110770456 | 2/2020 | F16C 33/12 |
| CN | 111656065 | 9/2020 | F16J 15/34 |
| DE | 3223703 | 6/1982 | F16J 15/34 |
| DE | 102008038396 | 2/2010 | |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 33396185 | 10/2018 | F16C 27/04 |
| EP | 3575621 | 12/2019 | F16C 33/10 |

(56) References Cited

FOREIGN PATENT DOCUMENTS

| | | | |
|---|---|---|---|
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 1509482 A * | 5/1978 | ............ F16C 17/045 |
| GB | 2263952 | 8/1993 | ............... F16J 15/34 |
| JP | S51-034974 | 3/1976 | |
| JP | S52-143571 | 10/1977 | ............... F16J 15/34 |
| JP | 57163770 | 10/1982 | ............ F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............ F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............... C25D 15/02 |
| JP | 2013-213545 | 10/2013 | ............... F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| KR | 10-2017-0093349 | 8/2017 | ............... F04B 53/10 |
| WO | WO 2006/051702 | 5/2006 | ............... F16J 15/34 |
| WO | WO 2011/115073 | 5/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

U.S. Appl. No. 16/964,943, filed Jul. 24, 2020, Imura et al.
U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,678, filed Jul. 23, 2021, Suzuki et al.
U.S. Appl. No. 17/433,561, filed Aug. 24, 2021, Miyazaki et al.
Official Action issued in related U.S. Appl. No. 16/969,175, dated Aug. 1, 2023, 6 pages.

* cited by examiner

Fig. 6 ROTATIONAL DIRECTION OF ROTATING SEAL RING
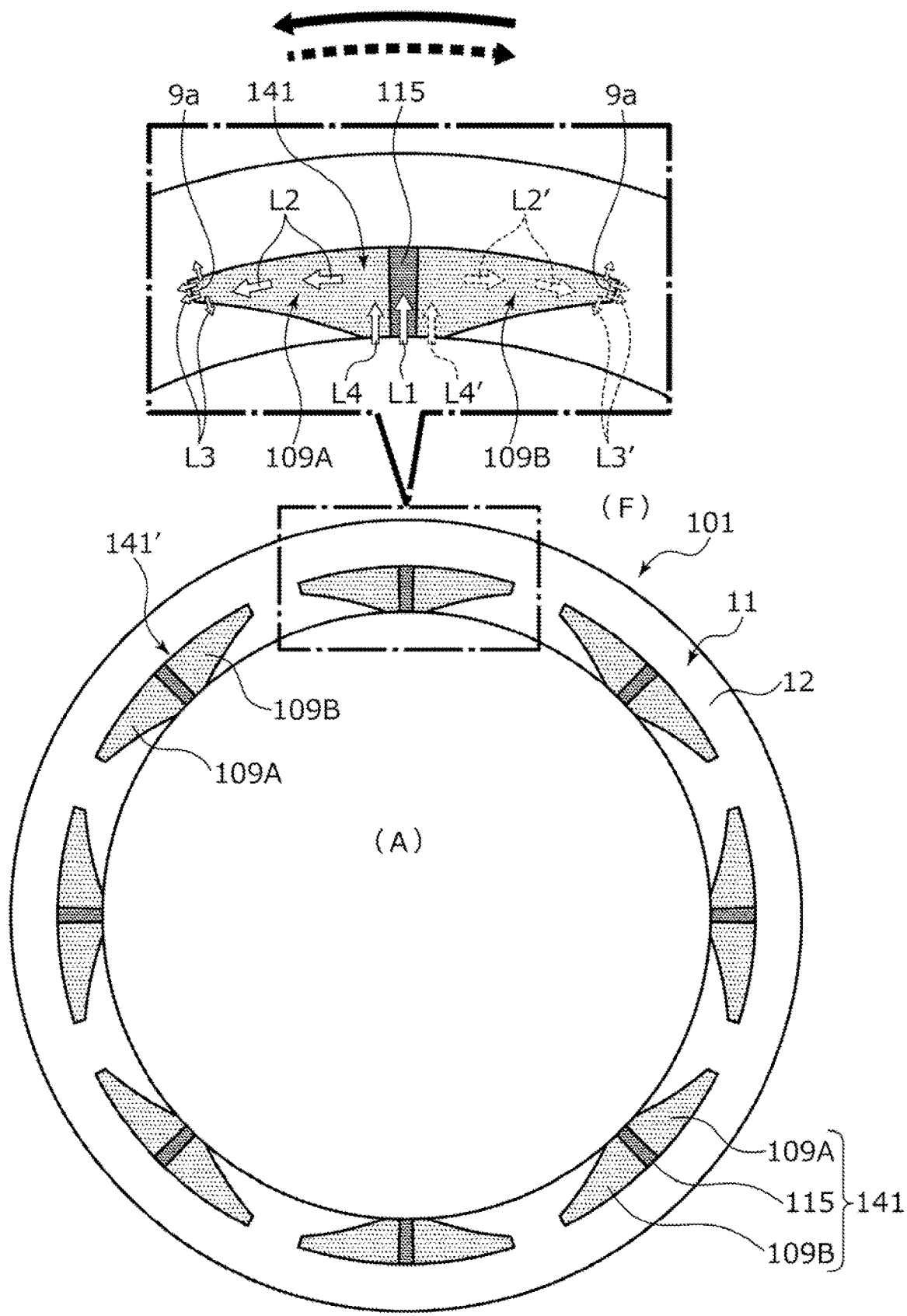

SLIDING COMPONENT

TECHNICAL FIELD

The present invention relates to a sliding component that is subjected to relative rotation, for example, a sliding component used in a seal device that seals a rotating shaft of a rotary machine in an automobile, a general industrial machine, or other sealing fields, or a sliding component used in a bearing of an automobile, a general industrial machine, or a machine in other bearing fields.

BACKGROUND ART

As a seal device that prevents leakage of a sealed liquid, for example, there is proposed a mechanical seal including a pair of sliding components which have an annular shape and rotate relative to each other to cause sliding surfaces to slide against each other. In such a mechanical seal, in recent years, there has been a desire that energy lost by sliding is reduced for environmental measures, and the sliding surface of the sliding component is provided with a positive pressure generating groove communicating with an outer diameter side which is a sealed liquid side of a high pressure, and having a closed one end in the sliding surface. Accordingly, when the sliding components rotate relative to each other, a positive pressure is generated in the positive pressure generating groove to separate the sliding surfaces from each other, and the sealed liquid is introduced into the positive pressure generating groove from the outer diameter side to be held therein. Therefore, the lubricity is improved, and the friction is reduced.

Further, in order to maintain sealability for a long period of time, the mechanical seal is required to satisfy a condition such as "sealing" in addition to "lubrication". For example, in a mechanical seal described in Patent Citation 1, one sliding component is provided with a Rayleigh step and a reverse Rayleigh step that communicate with a sealed liquid side. Accordingly, when sliding components rotate relative to each other, a positive pressure is generated between sliding surfaces by the Rayleigh step, to separate the sliding surfaces from each other, and the Rayleigh step holds a sealed liquid. Therefore, the lubricity is improved. Meanwhile, since a relatively negative pressure is generated in the reverse Rayleigh step, and the reverse Rayleigh step is disposed closer to a leakage side than the Rayleigh step, the sealed liquid of a high pressure which has flowed out from the Rayleigh step to a gap between the sliding surfaces can be suctioned into the reverse Rayleigh step. In such a manner, the sealed liquid between a pair of the sliding components is prevented from leaking to the leakage side, so that the sealability is improved.

CITATION LIST

Patent Literature

Patent Citation 1: WO 2012/046749 A (pages 14 to 16 and FIG. 1)

SUMMARY OF INVENTION

Technical Problem

However, in Patent Citation 1, since a structure where the reverse Rayleigh step causes the sealed liquid to return to the sealed liquid side is adopted, the sealed liquid is not supplied to the leakage side in the gap between the sliding surfaces, and there is a portion which has no contribution to lubricity, which is a problem. Therefore, sliding components having higher lubricity are required.

The present invention has been made in view of such a problem, and an object of the present invention is to provide a sliding component that supplies a sealed fluid to a leakage side in a gap between sliding surfaces to exhibit high lubricity and has a small leakage of the sealed fluid.

Solution to Problem

In order to solve the above problem, according to the present invention, there is provided a sliding component that has an annular shape and is disposed in a place where relative rotation is performed in a rotary machine, including a plurality of dynamic pressure generating mechanisms provided in a sliding surface of the sliding component. Each of the dynamic pressure generating mechanisms includes a deep groove portion that communicates with a leakage side, and a shallow groove portion that communicates with the deep groove portion and extends from the deep groove portion in a circumferential direction, the shallow groove portion being shallower than the deep groove portion, and an end portion in an extending direction of the shallow groove portion is formed into a tapered shape in a plan view. According to the aforesaid feature of the present invention, the deep groove portion has a deep groove depth and a large volume, so that a large amount of a sealed fluid supplied to the leakage side of the sliding surface can be recovered, and the sealed fluid can flow out from the shallow groove portions to a gap between sliding surfaces. Therefore, lubricity can be improved over a wide area of the sliding surface. In addition, since the sealed fluid is recovered by the deep groove portion communicating with the leakage side, and the recovered sealed fluid flows out from the shallow groove portions to the gap between the sliding surfaces to partly return to a sealed fluid side in a radial direction, the amount of the sealed fluid leaking to the leakage side is small. In addition, since the end portion in the extending direction of the shallow groove portion has a tapered shape, the flow rate of the sealed fluid returning from the end portion in the extending direction of the shallow groove portion to a gap between sliding surfaces is easily secured. Therefore, dynamic pressure can be stably generated.

It may be preferable that a leakage side edge of the end portion in the extending direction of the shallow groove portion is closer to a sealed fluid side than a leakage side edge of a step which is formed in a depth direction in a communication portion between the shallow groove portion and the deep groove portion. According to this preferable configuration, the end portion in the extending direction of the shallow groove portion is separated from the leakage side in a radial direction, so that the end portion in the extending direction can be disposed close to the sealed fluid side, and the sealed fluid can return from the end portion in the extending direction of the shallow groove portion to a position which is close to the sealed fluid side between the sliding surfaces. Therefore, a leakage of the sealed fluid can be reduced.

It may be preferable that wall surfaces partially defining the shallow groove portion and extending in the circumferential direction are curved. According to this preferable configuration, dynamic pressure can be adjusted according to the curvature of the shallow groove portions. In addition, since the distance to the end portion in the extending direction of each of the shallow groove portions can be increased, a large pressure can be obtained.

It may be preferable that the wall surface on the leakage side of the shallow groove portion is separated from the step in the circumferential direction. According to this preferable configuration, a part of the shallow groove portion communicates with a gas on the leakage side of the sliding component, so that when the amount of the sealed fluid in the deep groove portion is small, the gas can be directly suctioned from the shallow groove portion. Therefore, dynamic pressure can be stably generated.

It may be preferable that the shallow groove portion is formed by a first shallow groove portion and a second shallow groove portion extending from the deep groove portion to both sides in the circumferential direction. According to this preferable configuration, the first or second shallow groove portion which is disposed on one side in the circumferential direction of the deep groove portion can be used as one shallow groove portion for generating dynamic pressure. Therefore, the first and second shallow groove portions can be used without being limited by the relative rotational direction of the sliding component.

It may be preferable that in case that adjoining two of the dynamic pressure generating mechanisms in the circumferential direction are a first dynamic pressure generating mechanism and a second dynamic pressure generating mechanism, the first shallow groove portion of the first dynamic pressure generating mechanism is adjacent to the second shallow groove portion of the second dynamic pressure generating mechanism in the circumferential direction. According to this preferable configuration, during relative rotation of the sliding component, the sealed fluid which is supplied from the one shallow groove portion of the dynamic pressure generating mechanism to the gap between the sliding surfaces to tend to move the leakage side can be recovered by the other shallow groove portion of the dynamic pressure generating mechanism adjacent thereto.

It may be preferable that the deep groove portion communicates with an inner diameter side of the sliding component. According to this preferable configuration, the sealed fluid which has been supplied from the shallow groove portion to the gap between the sliding surfaces can return to the sealed fluid side due to centrifugal force, and the sealed fluid is easily held in the deep groove portion due to centrifugal force.

It may be preferable that the sliding surface of the sliding component is be provided with a specific dynamic pressure generating mechanism that is disposed on a sealed fluid side with respect to the dynamic pressure generating mechanism and is independent of the dynamic pressure generating mechanism. According to this preferable configuration, during relative rotation of the sliding component, while the specific dynamic pressure generating mechanism separates the sliding surfaces from each other to form an appropriate fluid film between the sliding surfaces, the amount of leakage of the sealed fluid to the leakage side can be reduced by the dynamic pressure generating mechanism.

It may be preferable that the specific dynamic pressure generating mechanism includes a deep groove portion that communicates with the sealed fluid side, and a shallow groove portion that communicates with the deep groove portion of the specific dynamic pressure generating mechanism, and the deep groove portion of the dynamic pressure generating mechanism and the deep groove portion of the specific dynamic pressure generating mechanism are arranged along a radial direction. According to this preferable configuration, the sealed fluid which tends to leak from the deep groove portion of the specific dynamic pressure generating mechanism to the leakage side between the sliding surfaces is easily introduced to the deep groove portion of the dynamic pressure generating mechanism. Therefore, a leakage of the sealed fluid to the leakage side can be efficiently reduced.

Incidentally, the fact that the shallow groove portion of the sliding component according to the present invention extends in the circumferential direction means that the shallow groove portion may extend with at least a component in the circumferential direction, preferably, may extend such that the component along the circumferential direction is larger than the component in the radial direction. In addition, the fact that the deep groove portion extends in the radial direction means that the deep groove portion may extend with at least a component in the radial direction, preferably, may extend such that the component along the radial direction is larger than the component in the circumferential direction.

In addition, the sealed fluid may be a liquid, or have a mist form in which a liquid and a gas are mixed.

BRIEF DESCRIPTION OF DRAWINGS

FIG. 6 is a view of a sliding surface of a stationary seal ring as a sliding component according to a second embodiment of the present invention when seen in the axial direction.

DESCRIPTION OF EMBODIMENTS

Figure 1:
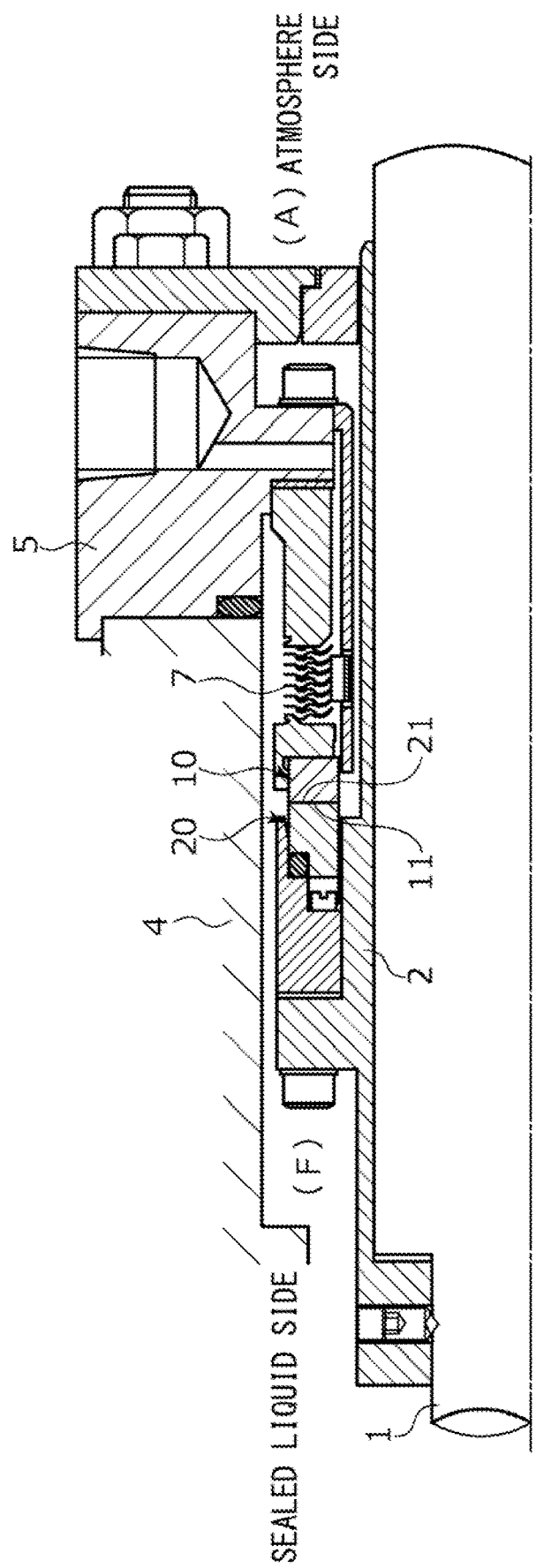
FIG. 1 is a longitudinal cross-sectional view illustrating one example of a mechanical seal including a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 5. Incidentally, in the present embodiment, a mode in which the sliding component is a mechanical seal will be described as an example. In addition, a description will be given based on the premise that an outer diameter side of the sliding component forming the mechanical seal is a sealed liquid side (i.e., high-pressure side) as a sealed fluid side and an inner diameter side is an atmosphere side (i.e., low-pressure side) as a leakage side. In addition, for convenience of description, in the drawings, dots may be added to a groove and the like formed in a sliding surface.

A mechanical seal for a general industrial machine illustrated in FIG. 1 is an inside mechanical seal that seals a sealed liquid F which tends to leak from an outer diameter side of sliding surfaces toward an inner diameter side, and mainly includes a rotating seal ring 20 which is a sliding component that has an annular shape and is provided on a rotating shaft 1 with a sleeve 2 interposed therebetween, to be integrally rotatable together with the rotating shaft 1, and a stationary seal ring 10 that has an annular shape and is a sliding component which is provided on a seal cover 5 fixed to a housing 4 of a mounted apparatus, to not be rotated but be movable in an axial direction. The stationary seal ring 10 is biased in the axial direction by a bellows 7, so that a sliding surface 11 of the stationary seal ring 10 and a sliding surface 21 of the rotating seal ring 20 slide against each other in close contact with each other. Incidentally, the sliding surface 21 of the rotating seal ring 20 is a flat surface, and a recessed portion is not provided in the flat surface.

The stationary seal ring 10 and the rotating seal ring 20 are representatively made of SiC (as an example of hard material) or a combination of SiC (as the example of hard material) and carbon (as an example of soft material); the sliding material is not limited thereto, and any type of sliding material is applicable as long as the sliding material is used as a sliding material for a mechanical seal. Incidentally, as the SiC, there are materials consisting of different components and compositions of two or more phases including a sintered body in which boron, aluminum, carbon, or the like is used as a sintering additive, for example, reaction-sintered SiC, SiC—TiC, SiC—TiN, and the like consisting of Sic or SiC and Si in which graphite particles are dispersed. As the carbon, resin molded carbon, sintered carbon, and the like carbon including carbon in which a carbonaceous material and a graphite material are mixed can be used. In addition, in addition to the above sliding materials, metallic materials, resin materials, surface modifiers (e.g., coating materials), composite materials, or the like are also applicable.

Figure 2:
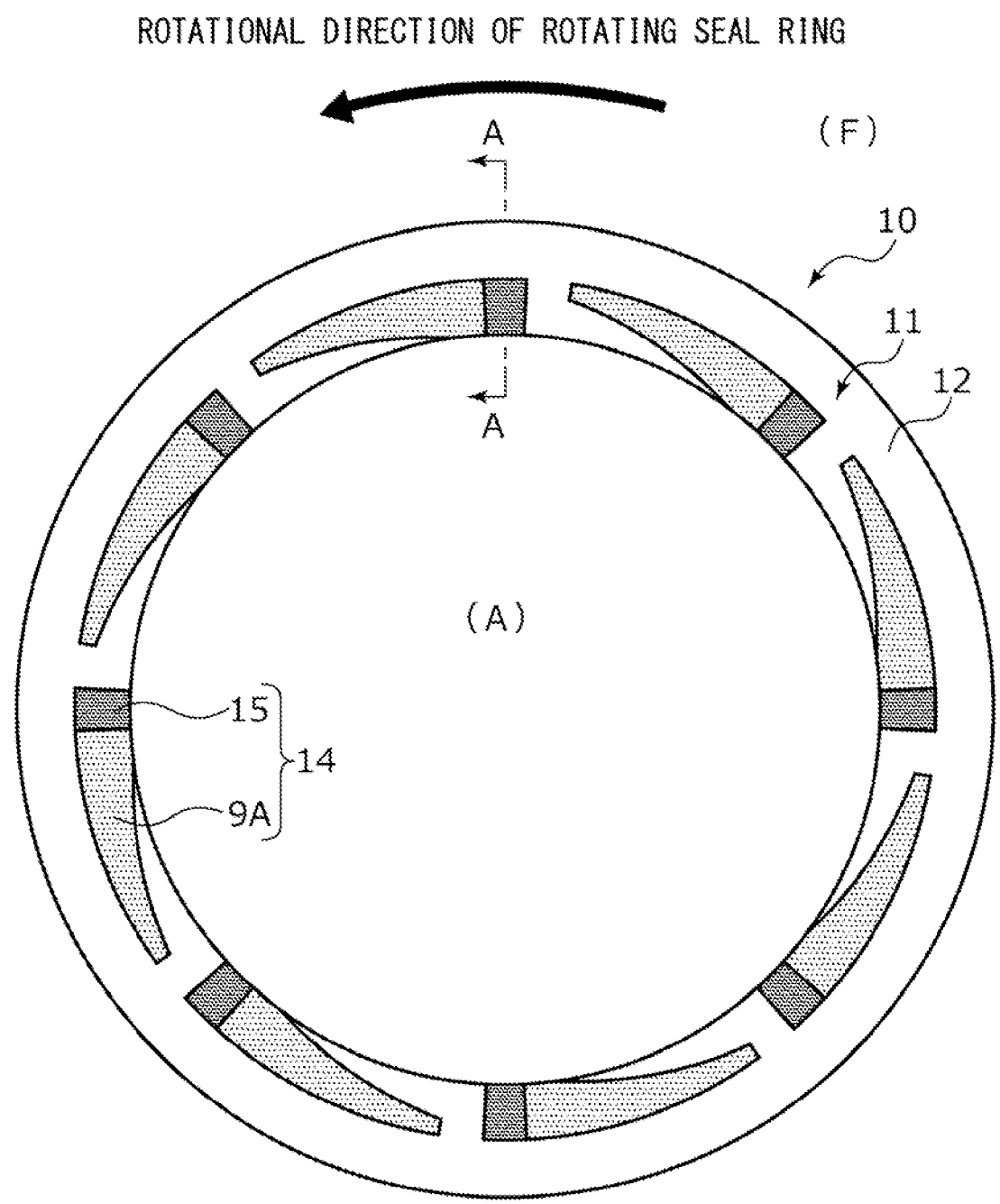
FIG. 2 is a view of a sliding surface of a stationary seal ring when seen in an axial direction in the first embodiment.

As illustrated in FIG. 2, the rotating seal ring 20 slides relative to the stationary seal ring 10 as indicated by an arrow, and a plurality of dynamic pressure generating mechanisms 14 are evenly provided in the sliding surface 11 of the stationary seal ring 10 in a circumferential direction of the stationary seal ring 10. A portion of the sliding surface 11 other than the dynamic pressure generating mechanisms 14 is a land 12 forming a flat surface.

Figure 3:
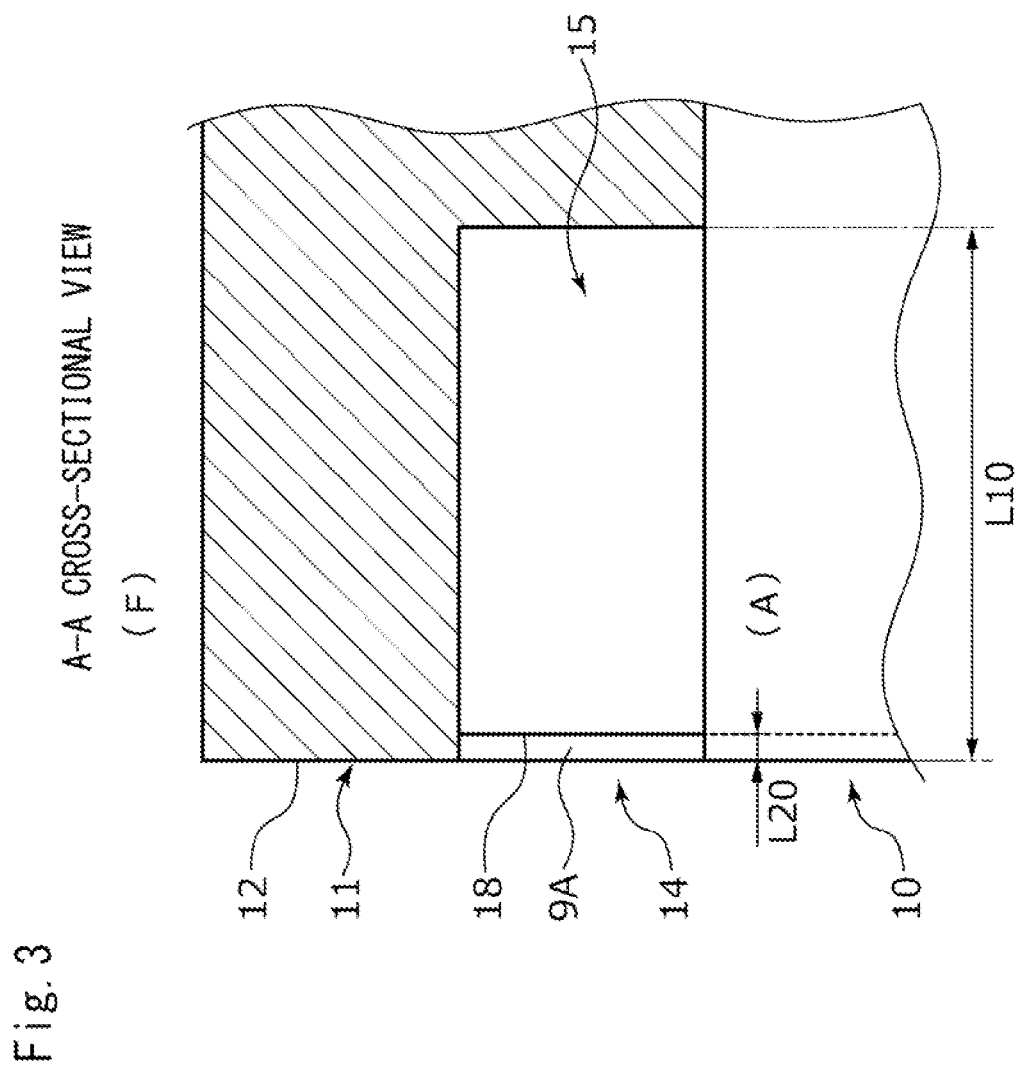
FIG. 3 is an A-A cross-sectional view.
Figure 4:
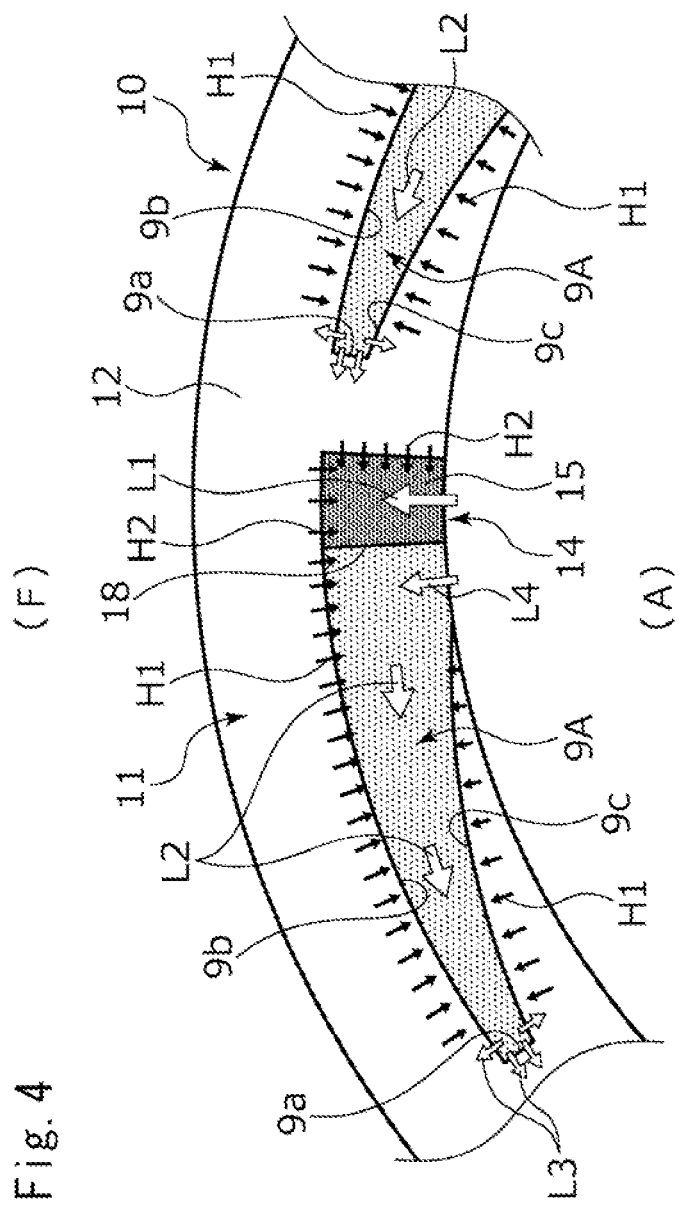
FIG. 4 is a main part enlarged view of the sliding surface of the stationary seal ring.

Next, an outline of the dynamic pressure generating mechanism 14 will be described based on FIGS. 2 to 4. Incidentally, hereinafter, a description will be given based on the premise that when the stationary seal ring 10 and the rotating seal ring 20 rotate relative to each other, the left side of the drawing sheet of FIG. 4 is a downstream side of the sealed liquid F flowing in a dynamic pressure generating groove 9A to be described later, and the right side of the drawing sheet of FIG. 4 is an upstream side of the sealed liquid F flowing in the dynamic pressure generating groove 9A.

The dynamic pressure generating mechanism 14 includes a liquid guide groove portion 15 as a deep groove portion that communicates with the atmosphere side and extends in an outer diameter direction, and the dynamic pressure generating groove 9A as a shallow groove portion that extends concentrically with the stationary seal ring 10 from the liquid guide groove portion 15 toward the downstream side in the circumferential direction. Incidentally, the liquid guide groove portion 15 of the first embodiment extends in a radial direction to be orthogonal to an axis of the stationary seal ring 10. In addition, the liquid guide groove portion 15 and the dynamic pressure generating groove 9A have the same width in the radial direction in a communication portion, and communicate with each other over the entire width in the radial direction, and a step 18 in a depth direction is formed in the communication portion.

In addition, an end portion in an extending direction, namely, an end portion on the downstream side of the dynamic pressure generating groove 9A has a tapered shape and includes a wall portion 9a that is orthogonal to a rotational direction, a high-pressure side wall surface 9b that extends concentrically with the stationary seal ring 10 from an outer diameter side end portion of the liquid guide groove portion 15 in the circumferential direction, and a low-pressure side wall surface 9c that extends in the circumferential direction while being convexly curved toward the high-pressure side from an inner peripheral surface of the stationary seal ring 10. Incidentally, the low-pressure side wall surface 9c is separated from the step 18 in the circumferential direction, the step 18 being formed in the communication portion between the liquid guide groove portion 15 and the dynamic pressure generating groove 9A. Namely, an opening of a part of the dynamic pressure generating groove 9A communicates with the atmosphere side at an inner periphery of the stationary seal ring 10. Further, incidentally, the wall portion 9a is not limited to being orthogonal to the rotational direction, for example, may be inclined with respect to the rotational direction or may be formed in a step shape.

In addition, a depth dimension L10 of the liquid guide groove portion 15 is larger than a depth dimension L20 of the dynamic pressure generating groove 9A (i.e., L10>L20). Specifically, in the first embodiment, the depth dimension L10 of the liquid guide groove portion 15 is 100 μm, and the depth dimension L20 of the dynamic pressure generating groove 9A is 5 μm. Namely, the step 18 in the depth direction is formed between the liquid guide groove portion 15 and the dynamic pressure generating groove 9A by a side surface on the downstream side of the liquid guide groove portion 15 and a bottom surface of the dynamic pressure generating groove 9A. Incidentally, as long as the depth dimension of the liquid guide groove portion 15 is larger than the depth dimension of the dynamic pressure generating groove 9A, the depth dimensions of the liquid guide groove portion 15 and the dynamic pressure generating groove 9A can be freely changed, and it is preferable that the dimension L10 is five times or more the dimension L20.

Incidentally, the bottom surface of the dynamic pressure generating groove 9A is a flat surface and is formed in parallel to the land 12; however, the flat surface is not prevented from being provided with a fine recessed portion or being formed to be inclined with respect to the land 12. Further, the high-pressure side wall surface 9b and the low-pressure side wall surface 9c, each having an arc shape and extending in the circumferential direction, of the dynamic pressure generating groove 9A each are orthogonal to the bottom surface of the dynamic pressure generating groove 9A. In addition, a bottom surface of the liquid guide groove portion 15 is a flat surface and is formed in parallel to the land 12; however, the flat surface is not prevented from being provided with a fine recessed portion or being formed to be inclined with respect to the land 12. Further, each of two flat surfaces of the liquid guide groove portion 15 is orthogonal to the bottom surface of the liquid guide groove portion 15, the two flat surfaces extending in the radial direction.

Next, the operation during relative rotation of the stationary seal ring 10 and the rotating seal ring 20 will be described. First, during non-operation of the general industrial machine, namely, when the rotating seal ring 20 does not rotate, a slight amount of the sealed liquid F on the outer diameter side of the sliding surfaces 11 and 21 enters a gap between the sliding surfaces 11 and 21 due to the capillary phenomenon, and in the dynamic pressure generating mechanism 14, the sealed liquid F which has remained during stop of the general industrial machine and the atmosphere which has entered from the inner diameter side of the sliding surfaces 11 and 21 are mixed. Incidentally, since the sealed liquid F has a higher viscosity than a gas, the amount of leakage from the dynamic pressure generating mechanism 14 to a low-pressure side during stop of the general industrial machine is small.

In a case where almost no sealed liquid F remains in the dynamic pressure generating mechanism 14 during stop of the general industrial machine, when the rotating seal ring 20 rotates relative to the stationary seal ring 10 (refer to the black arrow of FIG. 2), as illustrated in FIG. 4, a low-pressure side fluid A on the atmosphere side is introduced from the liquid guide groove portion 15 as indicated by an arrow L1, and the dynamic pressure generating groove 9A causes the low-pressure side fluid A to move in a following manner in the rotational direction of the rotating seal ring 20 as indicated by an arrow L2, so that dynamic pressure is generated in the dynamic pressure generating groove 9A. In addition, as indicated by an arrow L4, the low-pressure side fluid A on the atmosphere side is introduced also from the opening between the low-pressure side wall surface 9c of the dynamic pressure generating groove 9A and the step 18 between the liquid guide groove portion 15 and the dynamic pressure generating groove 9A.

The pressure is the highest in the vicinity of the wall portion 9a which is the end portion on the downstream side of the dynamic pressure generating groove 9A, so that the low-pressure side fluid A flows out from the vicinity of the wall portion 9a to the periphery thereof as indicated by an arrow L3. Incidentally, the pressure decreases gradually as the upstream side of the dynamic pressure generating groove 9A is approached.

In addition, when the stationary seal ring 10 and the rotating seal ring 20 rotate relative to each other, the sealed liquid F of a high pressure flows into the gap between the sliding surfaces 11 and 21 from the outer diameter side thereof at all times to perform so-called fluid lubrication. At this time, since the pressure of the sealed liquid F in the vicinity of the dynamic pressure generating groove 9A, as described above, particularly on the downstream side of the dynamic pressure generating groove 9A is high, as indicated by an arrow H1, the sealed liquid F remains located on the land 12 to hardly enter the dynamic pressure generating groove 9A. On the other hand, since the liquid guide groove portion 15 is a deep groove portion and communicates with the low-pressure side, as indicated by an arrow H2, the sealed liquid F in the vicinity of the liquid guide groove portion 15 easily enters the liquid guide groove portion 15. In addition, since the sealed liquid F is a liquid and has large surface tension, the sealed liquid F moves along side wall surfaces of the liquid guide groove portion 15 to easily enter the liquid guide groove portion 15.

Next, an operation in which the sealed liquid F suctioned into the liquid guide groove portion 15 flows out to the gap between the sliding surfaces 11 and 21 will be described.

Figure 5A:
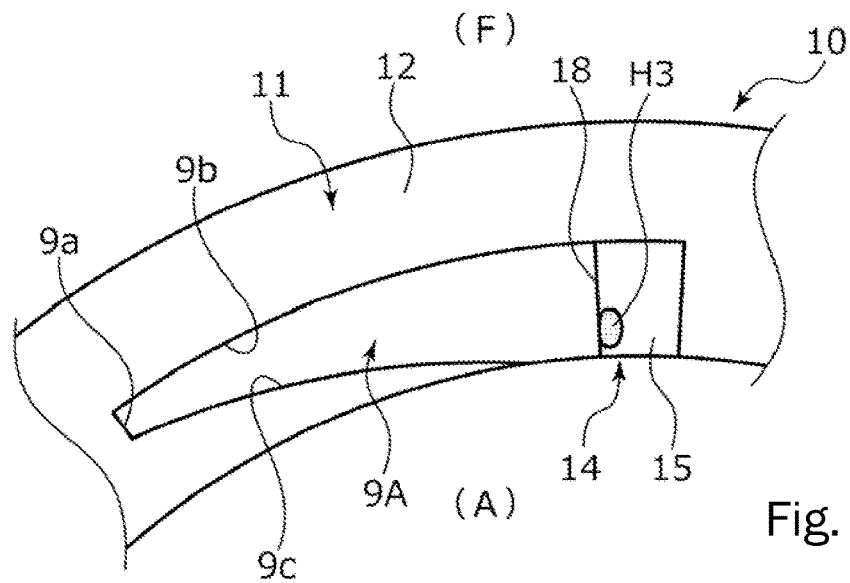
FIGS. 5A to 5C are schematic views describing an operation in which a sealed liquid which is suctioned from an inner diameter side of a liquid guide groove portion at an initial stage of relative rotation flows out to a gap between sliding surfaces in the first embodiment.
Figure 5B:
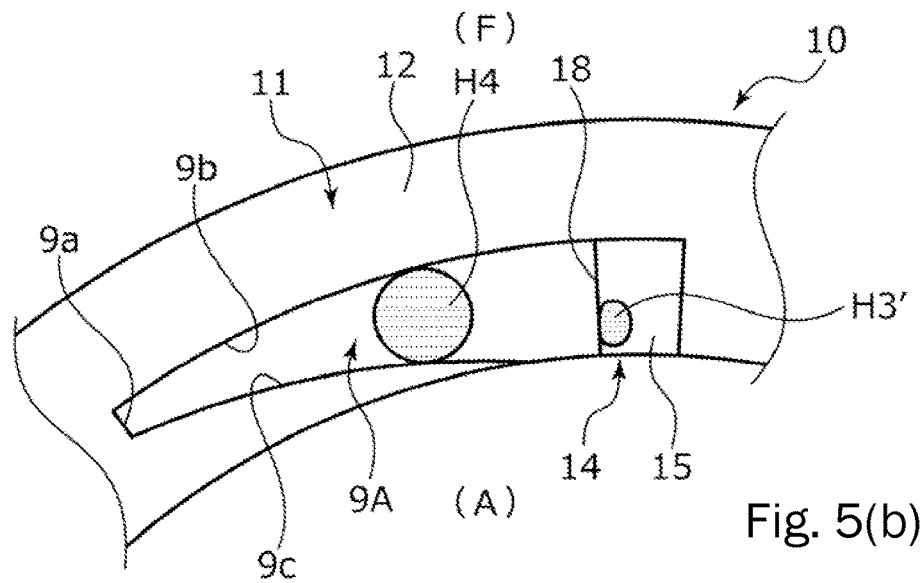

In a case where almost no sealed liquid F remains in the dynamic pressure generating mechanism 14, when the rotating seal ring 20 rotates relative to the stationary seal ring 10 (refer to the black arrow of FIG. 2), as illustrated in FIG. 5A, the sealed liquid F which has entered the liquid guide groove portion 15 becomes an agglomerated droplet as indicated by reference sign H3. Thereafter, as illustrated in FIG. 5B, when the droplet reaches a certain volume, as indicated by reference sign H4, the droplet is suctioned into the dynamic pressure generating groove 9A due to a relatively low pressure formed on the upstream side of the dynamic pressure generating groove 9A. At the same time, the sealed liquid F newly enters the liquid guide groove portion 15 to become a droplet H3'. At this time, the sealed liquid F of a larger amount than the amount at an initial stage of the relative rotation in FIG. 5A enters the liquid guide groove portion 15.

Figure 5C:
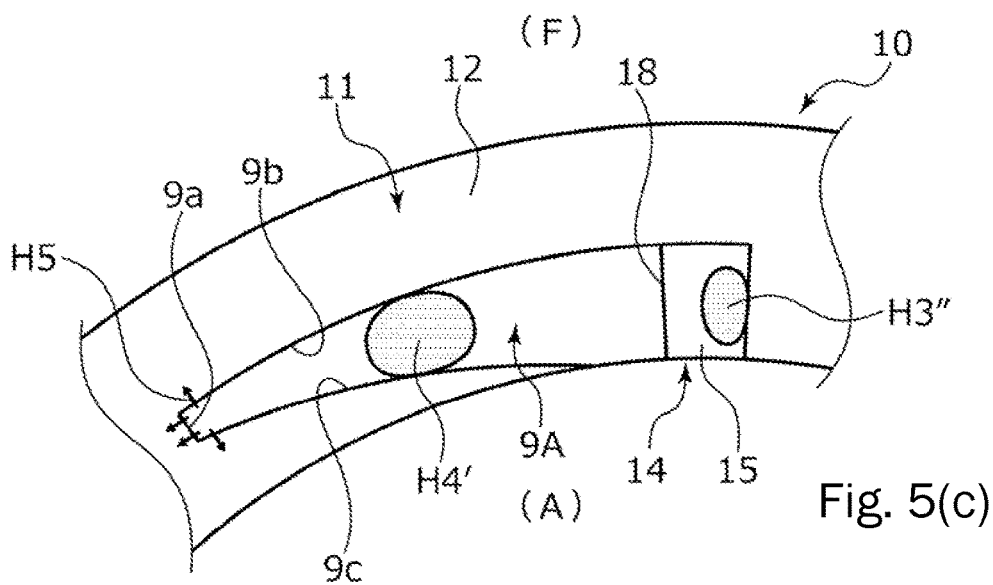

Thereafter, as illustrated in FIG. 5C, the sealed liquid F suctioned into the dynamic pressure generating groove 9A receives a large shearing force from the rotating seal ring 20 to move to the downstream side in the dynamic pressure generating groove 9A while the pressure increases, as indicated by an arrow H5, to flow out from the vicinity of the wall portion 9a to the periphery thereof. At the same time, a larger amount of the sealed liquid F newly enters the liquid guide groove portion 15 to become a droplet H3", and as indicated by reference sign H4', the droplet H3' is suctioned into the dynamic pressure generating groove 9A.

Thereafter, the amount of the sealed liquid F entering the liquid guide groove portion 15 is further increased than in the state illustrated in FIG. 5C, and a steady state where the sealed liquid F flows out continuously from the dynamic pressure generating groove 9A to the gap between the sliding surfaces 11 and 21 is reached. In the steady state, the sealed liquid F of a high pressure flows into the gap between the sliding surfaces 11 and 21 from the outer diameter side thereof or the dynamic pressure generating groove 9A at all times to perform fluid lubrication as described above. Incidentally, the time until the steady state is reached via the states of FIGS. 5A to 5C is a transient short time. In addition, when the sealed liquid F remains in the dynamic pressure generating mechanism 14 during stop of the general industrial machine, depending on the amount of the sealed liquid F remaining in the dynamic pressure generating mechanism 14, the operation starts from any one of the state of FIG. 5A, the state of FIG. 5B, the state of FIG. 5C, and the steady state.

Here, since the liquid guide groove portion 15 is a deep groove portion and communicates with the low-pressure side, the sealed liquid F indicated by the arrow H5 is easily suctioned into the liquid guide groove portion 15 adjacent thereto, so that the amount of the sealed liquid F between the sliding surfaces 11 and 21 is stable and high lubricity can be maintained. In addition, since a liquid has a larger interfacial tension for a solid than a gas, the sealed liquid F is easily held between the sliding surfaces 11 and 21, and the atmosphere is easily discharged to the inner diameter side of the stationary seal ring 10 and the rotating seal ring 20.

As described above, when the stationary seal ring 10 and the rotating seal ring 20 rotate relative to each other, the sealed liquid F which has entered the liquid guide groove portion 15 is suctioned into the dynamic pressure generating groove 9A, so that dynamic pressure is generated therein. Since the liquid guide groove portion 15 has a deep groove depth and a large volume, even when the sealed liquid F is supplied to the low-pressure side of the sliding surface 11, the sealed liquid F is recovered and returned from the dynamic pressure generating groove 9A to the gap between the sliding surfaces 11 and 21. Therefore, the lubricity can be improved over a wide area of the sliding surface 11. In addition, the sealed liquid F is recovered by the liquid guide groove portion 15 communicating with the low-pressure side on the inner diameter side of the sliding surfaces 11 and 21, and the sealed liquid F which is recovered flows out from the dynamic pressure generating groove 9A to the gap between the sliding surfaces 11 and 21 to partly return to the high-pressure side. Therefore, the amount of the sealed liquid F leaking to the low-pressure side is small. In addition, since the end portion on the downstream side of the dynamic pressure generating groove 9A has a tapered shape, the flow rate of the sealed liquid F returning from the wall portion 9a of the dynamic pressure generating groove 9A to the gap between the sliding surfaces 11 and 21 is easily secured. Therefore, dynamic pressure can be stably generated.

In addition, since a large amount of the sealed liquid F is held in the liquid guide groove portion 15, the amount of the sealed liquid F suctioned into the dynamic pressure generating groove 9A can be sufficiently secured, and even when the amount of the sealed liquid F held in the liquid guide groove portion 15 increases or decreases in a short time, the amount of the sealed liquid F suctioned into the dynamic pressure generating groove 9A can be substantially constant, and the sliding surfaces 11 and 21 can be avoided from being subjected to poor lubrication. In addition, since the liquid guide groove portion 15 communicates with the low-pressure side, the pressure in the liquid guide groove portion 15 is lower than the pressure of the sealed liquid F between the sliding surfaces 11 and 21, and the sealed liquid F in the vicinity of the liquid guide groove portion 15 is easily suctioned into the liquid guide groove portion 15.

In addition, the low-pressure side of the wall portion 9a which is the end portion on the downstream side of the dynamic pressure generating groove 9A is closer to the high-pressure side than the low-pressure side of the step 18 formed in the communication portion between the liquid guide groove portion 15 and the dynamic pressure generating groove 9A, namely, the end portion on the downstream side of the dynamic pressure generating groove 9A is separated from the low-pressure side in the radial direction, so that the wall portion 9a of the dynamic pressure generating groove 9A can be disposed close to the high-pressure side, and the sealed liquid F can return from the wall portion 9a of the dynamic pressure generating groove 9A to a position which is close to the high-pressure side between the sliding surfaces 11 and 21. Therefore, a leakage of the sealed liquid F can be reduced.

In addition, in the dynamic pressure generating groove 9A, since the wall surfaces 9b and 9c extending in the circumferential direction are curved, dynamic pressure can be adjusted according to the curvatures of the wall surfaces 9b and 9c. In addition, since the distance to the end portion in the extending direction of the dynamic pressure generating groove 9A can be increased, a large pressure can be obtained.

Further, in the dynamic pressure generating groove 9A, since the low-pressure side wall surface 9c is separated from the step 18 in the circumferential direction, the step 18 being formed in the communication portion between the liquid guide groove portion 15 and the dynamic pressure generating groove 9A, namely, a part of the dynamic pressure generating groove 9A communicates with the atmosphere on the low-pressure side, when the amount of the sealed liquid F in the liquid guide groove portion 15 is small, the atmosphere can be directly suctioned from the opening between the low-pressure side wall surface 9c and the step 18 between the liquid guide groove portion 15 and the dynamic pressure generating groove 9A. Therefore, dynamic pressure can be stably generated.

In addition, the liquid guide groove portion 15 extends in the radial direction. Specifically, since the liquid guide groove portion 15 extends in a direction orthogonal to a center axis of the stationary seal ring 10, the width in the circumferential direction of the liquid guide groove portion 15 is shortened, so that a large number of the liquid guide groove portions 15 can be disposed in the circumferential direction of the stationary seal ring 10. Therefore, the degree of freedom in design is high. Incidentally, the liquid guide groove portion 15 is not limited to extending in the direction orthogonal to the center axis of the stationary seal ring 10, and may be inclined from a position orthogonal to the center axis of the stationary seal ring 10. It is preferable that the inclination is less than 45 degrees. Further, the shape of the liquid guide groove portion 15 can be freely changed to an arc shape or the like.

In addition, since the step 18 is formed in the communication portion between the dynamic pressure generating groove 9A and the liquid guide groove portion 15 by the side surface on the downstream side of the liquid guide groove portion 15 and the bottom surface of the dynamic pressure generating groove 9A, the sealed liquid F can be held in the liquid guide groove portion 15 without being directly affected by dynamic pressure.

In addition, since the dynamic pressure generating groove 9A communicates with the liquid guide groove portion 15 over the entire width in the radial direction, an opening region of the dynamic pressure generating groove 9A to the liquid guide groove portion 15 can be secured, and the sealed liquid F held in the liquid guide groove portion 15 can be efficiently suctioned up.

In addition, the liquid guide groove portion 15 communicates with the inner diameter side of the stationary seal ring 10. Namely, the sliding component is an inside mechanical seal, and when the stationary seal ring 10 and the rotating seal ring 20 rotate relative to each other, the sealed liquid F in the dynamic pressure generating groove 9A can return to the high-pressure side due to centrifugal force, and a leakage of the sealed liquid F to the low-pressure side on the inner diameter side of the sliding surfaces 11 and 21 can be reduced.

In addition, since the dynamic pressure generating mechanism 14 is provided in the stationary seal ring 10, when the stationary seal ring 10 and the rotating seal ring 20 rotate relative to each other, the state inside the liquid guide groove portion 15 is easily kept close to atmospheric pressure.

Incidentally, in the first embodiment, a mode in which the liquid guide groove portion 15 and the dynamic pressure generating groove 9A communicate with each other over the entire width in the radial direction has been provided as an example; however, for example, a part of the outer diameter side end portion of the liquid guide groove portion 15 and the dynamic pressure generating groove 9A may communicate with each other, for example, the liquid guide groove portion 15 and the dynamic pressure generating groove 9A may communicate with each other to form an inverted L shape when seen in the direction orthogonal to the sliding surface 11.

In addition, the step may not be provided in the communication portion between the liquid guide groove portion 15 and the dynamic pressure generating groove 9A, for example, the liquid guide groove portion 15 and the dynamic pressure generating groove 9A may communicate with each other through an inclined surface. In this case, for example, a portion having a depth dimension of 5 µm or less can be the dynamic pressure generating groove 9A, and a portion which is deeper than 5 µm can be the liquid guide groove portion 15.

In addition, the dynamic pressure generating groove 9A is not limited to extending concentrically with the stationary seal ring 10 in the circumferential direction, for example, may be formed in an arc shape such that the end portion on the downstream side faces the high-pressure side. In addition, the dynamic pressure generating groove 9A may extend linearly from the liquid guide groove portion 15, or may extend in a meandering manner.

Second Embodiment

Next, a sliding component according to a second embodiment will be described with reference to FIG. 6. Incidentally, the description of configurations which are the same as and duplicated from those in the first embodiment will be omitted.

As illustrated in FIG. 6, a dynamic pressure generating mechanism 141 provided in a stationary seal ring 101 includes a liquid guide groove portion 115, a dynamic pressure generating groove 109A, and a dynamic pressure generating groove 109B as a shallow groove portion that extends concentrically with the stationary seal ring 101 from the liquid guide groove portion 115 toward the downstream side in the circumferential direction. In addition, the dynamic pressure generating groove 109B is formed with the same depth dimension of 5 µm as that of the dynamic pressure generating groove 109A.

When the rotating seal ring 20 rotates counterclockwise on the drawing sheet as indicated by a solid arrow of FIG. 6, the low-pressure side fluid A moves in order of arrows L1, L2, and L3 and in order of arrows L4, L2, and L3, so that dynamic pressure is generated in the dynamic pressure generating groove 109A. In addition, when the rotating seal ring 20 rotates clockwise on the drawing sheet as indicated by a dotted arrow of FIG. 6, the low-pressure side fluid A moves in order of arrows L1, L2', and L3' and in order of arrows L4', L2', and L3', so that dynamic pressure is generated in the dynamic pressure generating groove 109B.

As described above, since the dynamic pressure generating grooves 109A and 109B extend from the liquid guide groove portion 115 to both sides in the circumferential direction, and one of the dynamic pressure generating grooves 109A and 109B can be used as a shallow groove portion for generating dynamic pressure, the dynamic pressure generating groove 109A or 109B can be used regardless of the relative rotational direction of the stationary seal ring 101 and the rotating seal ring 20.

In addition, the dynamic pressure generating groove 109A of the dynamic pressure generating mechanism 141 is adjacent, in the circumferential direction, to the dynamic pressure generating groove 109B of a dynamic pressure generating mechanism 141' adjacent thereto. Accordingly, the sealed liquid F which flows out from the vicinity of the wall portion 9a of the dynamic pressure generating groove 109A of the dynamic pressure generating mechanism 141 to the periphery thereof to tend to move to the inner diameter side is suctioned from the dynamic pressure generating groove 109B of the dynamic pressure generating mechanism 141' adjacent thereto. Therefore, a leakage of the sealed liquid F to the low-pressure side can be reduced.

Incidentally, in the second embodiment, a case where the dynamic pressure generating grooves 109A and 109B have the same depth dimension has been provided as an example; however, the dynamic pressure generating grooves 109A and 109B may be formed with different depth dimensions. In addition, both may be the same or different from each other also in length in the circumferential direction and width in the radial direction.

In addition, the dynamic pressure generating groove 109A of the dynamic pressure generating mechanism 141 and the dynamic pressure generating groove 109B of the dynamic pressure generating mechanism 141' adjacent thereto may be separated from each other by a long distance in the circumferential direction to further increase the pressure which separates the sliding surfaces 11 and 21 from each other.

Third Embodiment

Next, a sliding component according to a third embodiment will be described with reference to FIG. 7. Incidentally, the description of configurations which are the same as and duplicated from those in the second embodiment will be omitted.

Figure 7:
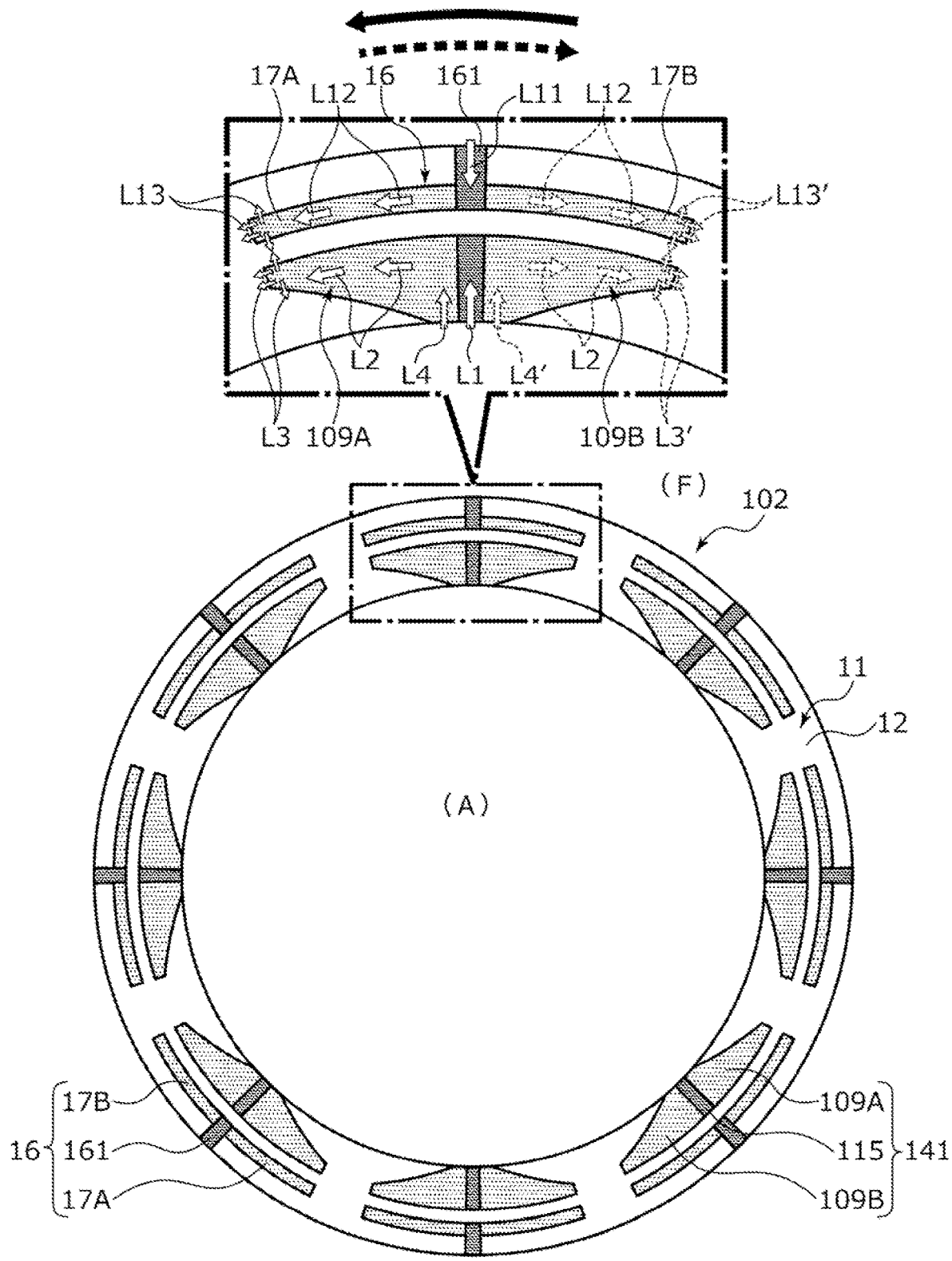
FIG. 7 is a view of a sliding surface of a stationary seal ring as a sliding component according to a third embodiment of the present invention when seen in the axial direction.

As illustrated in FIG. 7, a plurality of the dynamic pressure generating mechanisms 141 and a plurality of specific dynamic pressure generating mechanisms 16 are formed in a stationary seal ring 102. The specific dynamic pressure generating mechanism 16 includes a liquid guide groove portion 161 communicating with the high-pressure side, a Rayleigh step 17A that extends concentrically with the stationary seal ring 102 from an inner diameter side end portion of the liquid guide groove portion 161 toward the downstream side in the circumferential direction, and a reverse Rayleigh step 17B that extends concentrically with the stationary seal ring 102 from the inner diameter side end portion of the liquid guide groove portion 161 toward the upstream side in the circumferential direction. The liquid guide groove portion 161 and the liquid guide groove portion 115 are formed at positions corresponding to each other in the circumferential direction. Namely, the liquid guide groove portion 161 and the liquid guide groove portion 115 are formed along the radial direction. In addition, the liquid guide groove portion 161 functions as a deep groove portion of the specific dynamic pressure generating mechanism 16, and the Rayleigh step 17A and the reverse Rayleigh step 17B function as shallow groove portions of the specific dynamic pressure generating mechanism 16.

The dynamic pressure generating grooves 109A and 109B of the dynamic pressure generating mechanism 141 are formed with the same length in the circumferential direction as that of the Rayleigh step 17A and the reverse Rayleigh step 17B of the specific dynamic pressure generating mechanism 16. In addition, the Rayleigh step 17A and the reverse Rayleigh step 17B are formed with the same depth dimension of 5 µm as that of the dynamic pressure generating grooves 109A and 109B. In addition, the width in the radial direction of the Rayleigh step 17A and the reverse Rayleigh step 17B is smaller than the width in the radial direction of the dynamic pressure generating grooves 109A and 109B. Namely, the volume of the dynamic pressure generating mechanism 141 is larger than the volume of the specific dynamic pressure generating mechanism 16.

When the rotating seal ring 20 rotates counterclockwise on the drawing sheet as indicated by a solid arrow of FIG.

7, the sealed liquid F moves in order of arrows L11, L12, and L13, so that dynamic pressure is generated in the Rayleigh step 17A. In addition, when the rotating seal ring 20 rotates clockwise on the drawing sheet as indicated by a dotted arrow of FIG. 7, the sealed liquid F moves in order of arrows L11, L12', and L13', so that dynamic pressure is generated in the reverse Rayleigh step 17B. In such a manner, regardless of the relative rotational direction of the stationary seal ring 102 and the rotating seal ring 20, dynamic pressure can be generated in the specific dynamic pressure generating mechanism 16.

In addition, while the dynamic pressure generated in the specific dynamic pressure generating mechanism 16 separates the sliding surfaces 11 and 21 from each other to form an appropriate liquid film therebetween, the sealed liquid F which tends to leak from the sliding surface 11 to the low-pressure side can be recovered by the dynamic pressure generating mechanism 141.

In addition, since the liquid guide groove portion 161 and the liquid guide groove portion 115 are formed along the radial direction, the sealed liquid F tending to leak from the liquid guide groove portion 161 to the low-pressure side is easily introduced to the liquid guide groove portion 115 between the sliding surfaces 11 and 21. Therefore, a leakage of the sealed liquid F to the low-pressure side can be efficiently reduced.

In addition, since the volume of the dynamic pressure generating mechanism 141 is larger than the volume of the specific dynamic pressure generating mechanism 16, the suctioning force of the dynamic pressure generating grooves 109A and 109B of the dynamic pressure generating mechanism 141 is increased, so that a balance in dynamic pressure between the dynamic pressure generating mechanism 141 on the low-pressure side and the specific dynamic pressure generating mechanism 16 on the high-pressure side can be adjusted.

Incidentally, the length in the circumferential direction of the dynamic pressure generating grooves 109A and 109B may be longer than that of the Rayleigh step 17A and the reverse Rayleigh step 17B, or may be shorter than that of the Rayleigh step 17A and the reverse Rayleigh step 17B. In addition, the Rayleigh step 17A and the reverse Rayleigh step 17B may be formed with a depth dimension different from that of the dynamic pressure generating grooves 109A and 109B. In addition, the width in the radial direction of the Rayleigh step 17A and the reverse Rayleigh step 17B may be larger than the width in the radial direction of the dynamic pressure generating grooves 109A and 109B. Preferably, the volume of the dynamic pressure generating mechanism 141 may be larger than the volume of the specific dynamic pressure generating mechanism 16.

Figure 8A:
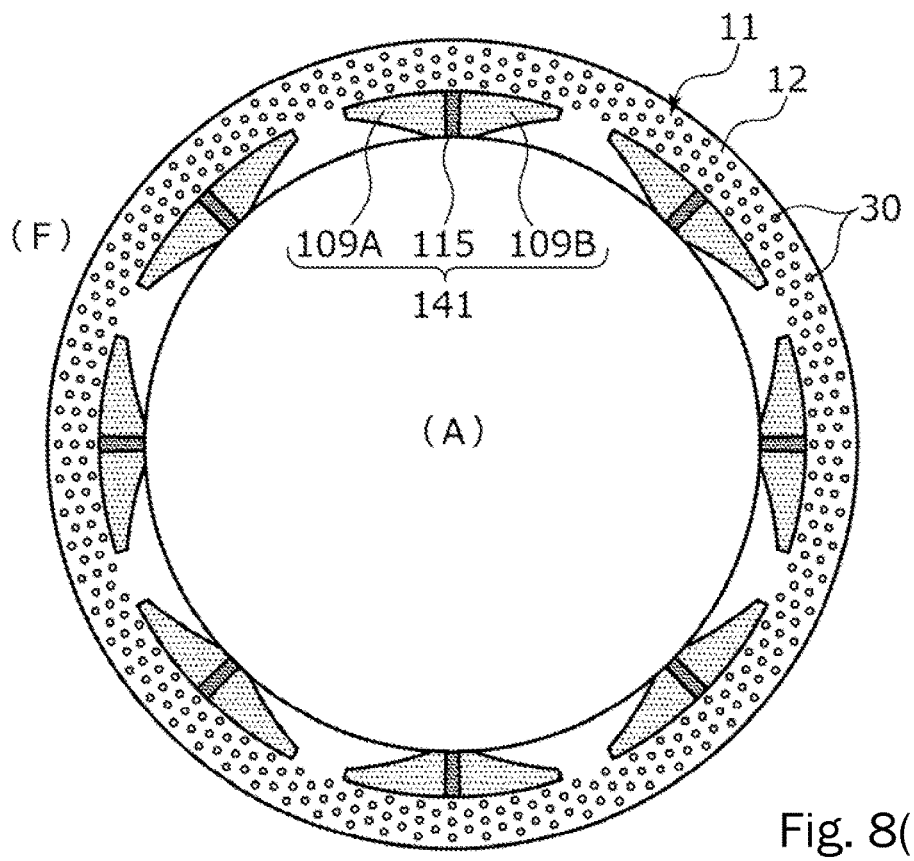
FIG. 8A is a description view illustrating a first modification example in the third embodiment.

Next, modification examples of the specific dynamic pressure generating mechanism will be described. As illustrated in FIG. 8A, a specific dynamic pressure generating mechanism of a first modification example is a dimple 30 having a circular recess shape when seen in the direction orthogonal to the sliding surface 11. Incidentally, the shape, number, disposition, and the like of the dimples 30 can be freely changed.

Figure 8B:
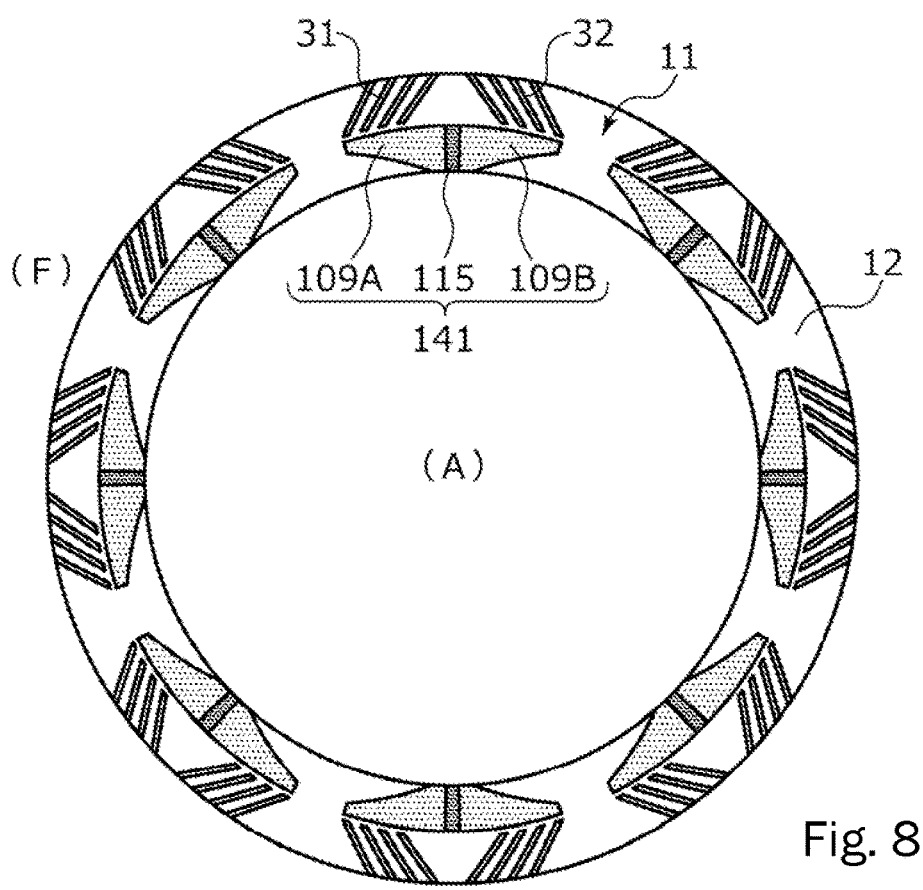
FIG. 8B is a description view illustrating a second modification example in the third embodiment.

In addition, as illustrated in FIG. 8B, a specific dynamic pressure generating mechanism of a second modification example includes arc grooves 31 and 32 that extend in an arc shape while being inclined in the radial direction. Specifically, outer diameter side end portions of the arc grooves 31 and 32 communicate with the high-pressure side. A plurality of the arc grooves 31 are provided on the outer diameter side of the dynamic pressure generating groove 109A, and a plurality of the arc grooves 32 are provided on the outer diameter side of the dynamic pressure generating groove 109B.

In addition, the arc groove 31 has a shape such that when the rotating seal ring 20 rotates counterclockwise on the drawing sheet of FIG. 8B, the sealed liquid F moves toward the inner diameter side, and the arc groove 32 has a shape such that when the rotating seal ring 20 rotates clockwise on the drawing sheet of FIG. 8B, the sealed liquid F moves toward the inner diameter side. When the rotating seal ring 20 rotates counterclockwise, the pressure on the inner diameter side of the arc groove 31 increases, and when the rotating seal ring 20 rotates clockwise, the pressure on the inner diameter side of the arc groove 32 increases. Therefore, the sliding surfaces 11 and 21 can be separated from each other to form an appropriate liquid film therebetween. Incidentally, the shape, number, disposition, and the like of the arc grooves 31 and 32 can be freely changed.

Fourth Embodiment

Next, a sliding component according to a fourth embodiment will be described with reference to FIG. 9. Incidentally, the description of configurations which are the same as and duplicated from those in the third embodiment will be omitted.

Figure 9:
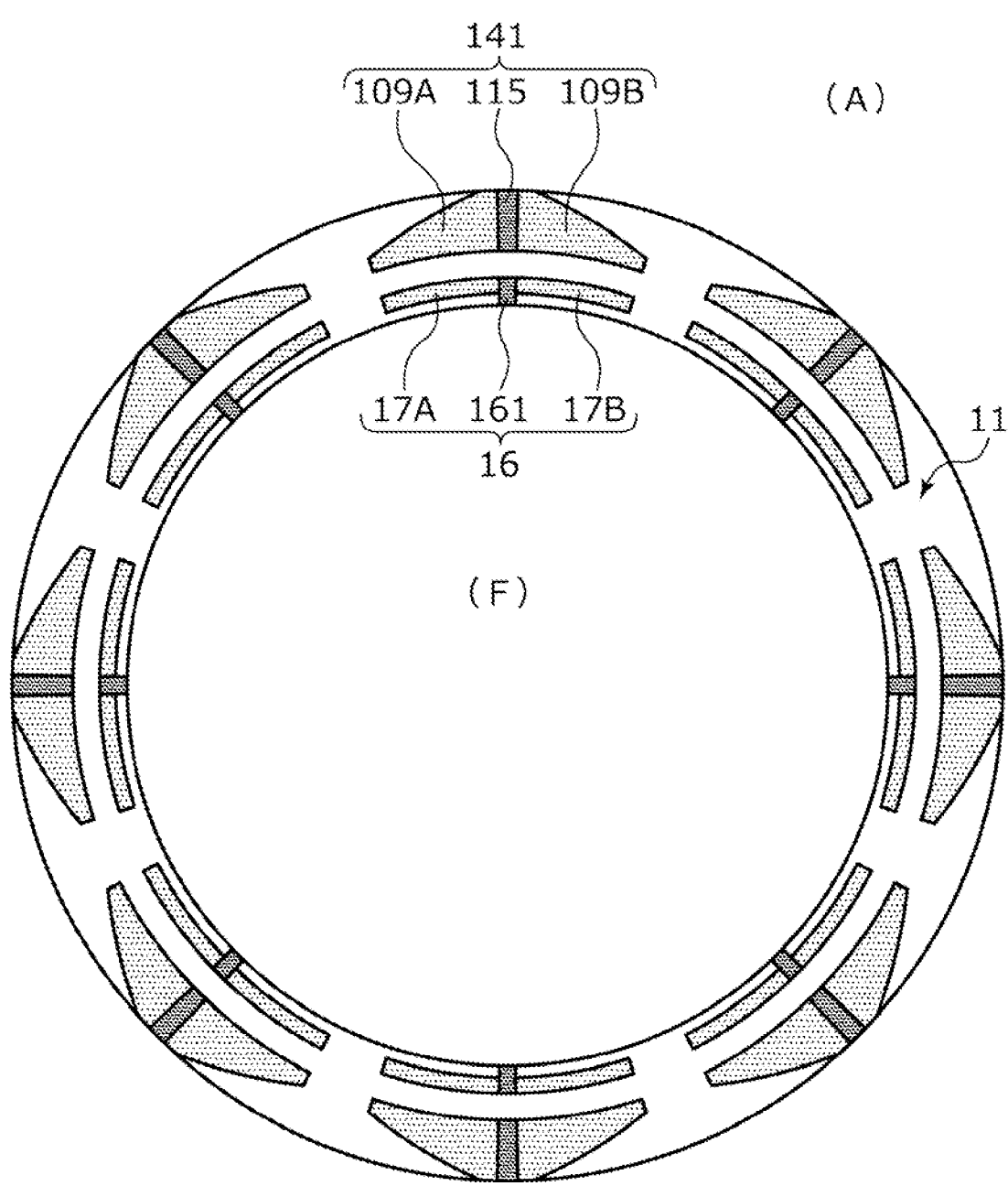
FIG. 9 is a view of a sliding surface of a stationary seal ring as a sliding component according to a fourth embodiment of the present invention when seen in the axial direction.

A mechanical seal illustrated in FIG. 9 is an outside mechanical seal that seals the sealed liquid F which tends to leak from an inner diameter side of sliding surfaces toward an outer diameter side. The dynamic pressure generating mechanism 141 is disposed on the outer diameter side to communicate with a low-pressure side, and the specific dynamic pressure generating mechanism 16 is disposed on the inner diameter side to communicate with a high-pressure side. Incidentally, even in the outside mechanical seal, the dynamic pressure generating mechanism may be formed to correspond to one rotational direction as in the first embodiment. In addition, the specific dynamic pressure generating mechanism may not be provided as in the first embodiment, or the specific dynamic pressure generating mechanism may be formed in another form such as the dimple or the arc grooves illustrated in the modification examples of the third embodiment.

The embodiments of the present invention have been described above with reference to the drawings; however, the specific configuration is not limited to the embodiments, and the present invention also includes changes or additions that are made without departing from the concept of the present invention.

For example, in the embodiments, as an example of the sliding component, the mechanical seal for a general industrial machine has been described, but the present invention may be applied to other mechanical seals for an automobile, a water pump, and the like. In addition, the present invention is not limited to the mechanical seal, and may be applied to a sliding component such as a slide bearing other than the mechanical seal.

In addition, in the embodiments, an example where the dynamic pressure generating mechanism is provided only in the stationary seal ring has been described; however, the dynamic pressure generating mechanism may be provided only in the rotating seal ring 20, or may be provided in both the rotating seal ring 20 and the stationary seal ring.

In addition, in the embodiments, a mode in which the sliding component is provided with the plurality of dynamic pressure generating mechanisms having the same shape has been provided as an example; however, a plurality of dynamic pressure generating mechanisms having different shapes may be provided. In addition, the interval between the dynamic pressure generating mechanism, the number of the dynamic pressure generating mechanisms, or the like can be appropriately changed.

In addition, the shallow groove portion which communicates with the low-pressure side on the inner diameter side of the dynamic pressure generating groove, extends in parallel to the dynamic pressure generating groove in the circumferential direction, and is independent of the dynamic pressure generating groove may be provided. Accordingly, the sealed liquid F flowing out from the shallow groove portion can be further trapped by the shallow groove portion that communicates with the low-pressure side and is independent. Therefore, the amount of the sealed liquid F on the high-pressure side leaking to the low-pressure side can be further reduced. In addition, since the amount of introduction of the sealed liquid F into the shallow groove portion which does not communicate with the deep groove portion and is independent can be increased, the effective range of the dynamic pressure generating mechanism can be widened.

In addition, the description has been given based on the premise that the sealed fluid side is a high-pressure side and the leakage side is a low-pressure side; however, the sealed fluid side may be a low-pressure side and the leakage side may be a high-pressure side, or the sealed fluid side and the leakage side may have substantially the same pressure.

REFERENCE SIGNS LIST

9A Dynamic pressure generating groove (shallow groove portion)
9B Dynamic pressure generating groove (shallow groove portion)
9b Wall surface
9c Wall surface (wall surface on leakage side)
10 Stationary seal ring (sliding component)
11 Sliding surface
14 Dynamic pressure generating mechanism
15 Liquid guide groove portion (deep groove portion)
16 Specific dynamic pressure generating mechanism
17A Rayleigh step (shallow groove portion)
17B Reverse Rayleigh step (shallow groove portion)
18 Step
20 Rotating seal ring (sliding component)
21 Sliding surface
109A Dynamic pressure generating groove (shallow groove portion)
109B Dynamic pressure generating groove (shallow groove portion)
115 Liquid guide groove portion (deep groove portion)
141 Dynamic pressure generating mechanism
161 Liquid guide groove portion (deep groove portion)

The invention claimed is:

1. A sliding component that has an annular shape and is disposed in a place where relative rotation is performed in a rotary machine, comprising a plurality of dynamic pressure generating mechanisms provided in a sliding surface of the sliding component, wherein
each of the dynamic pressure generating mechanisms includes a deep groove portion that communicates with a leakage side, and a shallow groove portion that has a first end portion communicating with the deep groove portion and a second end portion opposed to the first end portion in a circumferential direction and that extends from the first end portion to the second end portion in a circumferential direction, the shallow groove portion being shallower than the deep groove portion,
the shallow groove portion has a side wall surface formed at least on the leakage side of the second end portion so as to isolate the second end portion from the leakage side,
the shallow groove portion has an opening that is formed at the first end portion or between the first end portion and the side wall surface and that directly communicates with the leakage side,
the second end portion of the shallow groove portion is formed into a tapered shape in a plan view, and
the side wall surface is constituted by a curved surface which extends from the second end portion continuously toward a downstream side in a direction of the relative rotation up to an edge of the opening of the shallow groove.

2. The sliding component according to claim 1, wherein a leakage side edge of the second end portion of the shallow groove portion is closer to a sealed fluid side than a leakage side edge of a step which is formed in a depth direction in a communication portion between the shallow groove portion and the deep groove portion.

3. The sliding component according to claim 1, wherein the shallow groove portion is formed by a first shallow groove portion and a second shallow groove portion extending from the deep groove portion to both sides in the circumferential direction.

4. The sliding component according to claim 3, wherein the first shallow groove portion of first one of adjoining two of the dynamic pressure generating mechanisms in the circumferential direction is adjacent to the second shallow groove portion of second one of the adjoining two of the dynamic pressure generating mechanisms.

5. The sliding component according to claim 1, wherein the deep groove portion communicates with an inner diameter side of the sliding component.

6. The sliding component according to claim 1, wherein the sliding surface of the sliding component is provided with a specific dynamic pressure generating mechanism that is disposed on a sealed fluid side with respect to the dynamic pressure generating mechanism and is independent of the dynamic pressure generating mechanism.

7. The sliding component according to claim 6, wherein the specific dynamic pressure generating mechanism includes a deep groove portion that communicates with the sealed fluid side, and a shallow groove portion that communicates with the deep groove portion of the specific dynamic pressure generating mechanism, and the deep groove portion of the dynamic pressure generating mechanism and the deep groove portion of the specific dynamic pressure generating mechanism are arranged along a radial direction.

8. The sliding component according to claim 2, wherein the shallow groove portion is formed by a first shallow groove portion and a second shallow groove portion extending from the deep groove portion to both sides in the circumferential direction.

9. The sliding component according to claim 8, wherein the first shallow groove portion of first one of adjoining two of the dynamic pressure generating mechanisms in the circumferential direction is adjacent to the second shallow groove portion of second one of the adjoining two of the dynamic pressure generating mechanisms.

10. The sliding component according to claim 2, wherein the deep groove portion communicates with an inner diameter side of the sliding component.

11. The sliding component according to claim 2, wherein the sliding surface of the sliding component is provided with a specific dynamic pressure generating mechanism that is disposed on a sealed fluid side with respect to the dynamic pressure generating mechanism and is independent of the dynamic pressure generating mechanism.

12. The sliding component according to claim 11, wherein the specific dynamic pressure generating mechanism includes a deep groove portion that communicates with the sealed fluid side, and a shallow groove portion that communicates with the deep groove portion of the specific dynamic pressure generating mechanism, and the deep groove portion of the dynamic pressure generating mechanism and the deep groove portion of the specific dynamic pressure generating mechanism are arranged along a radial direction.

* * * * *